United States Patent [19]

Dubé

[11] 4,134,084
[45] Jan. 9, 1979

[54] HYBRID LASER STRUCTURES

[75] Inventor: George Dubé, Temperance, Mich.

[73] Assignee: Owens-Illinois, Inc., Toledo, Ohio

[21] Appl. No.: 727,826

[22] Filed: Sep. 29, 1976

[51] Int. Cl.² .............................................. H01S 3/00
[52] U.S. Cl. ........................... 331/94.5 F; 331/94.5 L
[58] Field of Search ...................... 331/94.5 E, 94.5 F, 331/94.5 D, 94.5 G, 94.5 L

[56] References Cited

U.S. PATENT DOCUMENTS

| | | | |
|---|---|---|---|
| 3,602,836 | 8/1971 | Young | 331/94.5 F |
| 3,766,493 | 10/1973 | Nicolai et al. | 331/94.5 L |
| 3,842,368 | 10/1974 | Myers | 331/94.5 E |
| 4,050,034 | 9/1977 | Barry et al. | 331/94.5 G |

Primary Examiner—William L. Sikes
Assistant Examiner—Marcus S. Rasco
Attorney, Agent, or Firm—Richard D. Heberling

[57] ABSTRACT

Hybrid laser structures are disclosed, the structures being axial gradient lasers that are a combination of solid-state lasable plate elements spaced along the optical axis of the laser and a cooling liquid for the plate elements, the liquid having lasing ions that lase at a wave length that is different from the wave length of the lasing ions of the plate elements. The solid-state plate elements can be made of a crystalline or glass host material doped with, for example, $Cr^{3+}$ ions, and the cooling liquid whose stimulated emission is at a different wave length than that of the plate element can be, for instance, selenium oxychloride doped with $Nd^{3+}$ ions.

4 Claims, 2 Drawing Figures

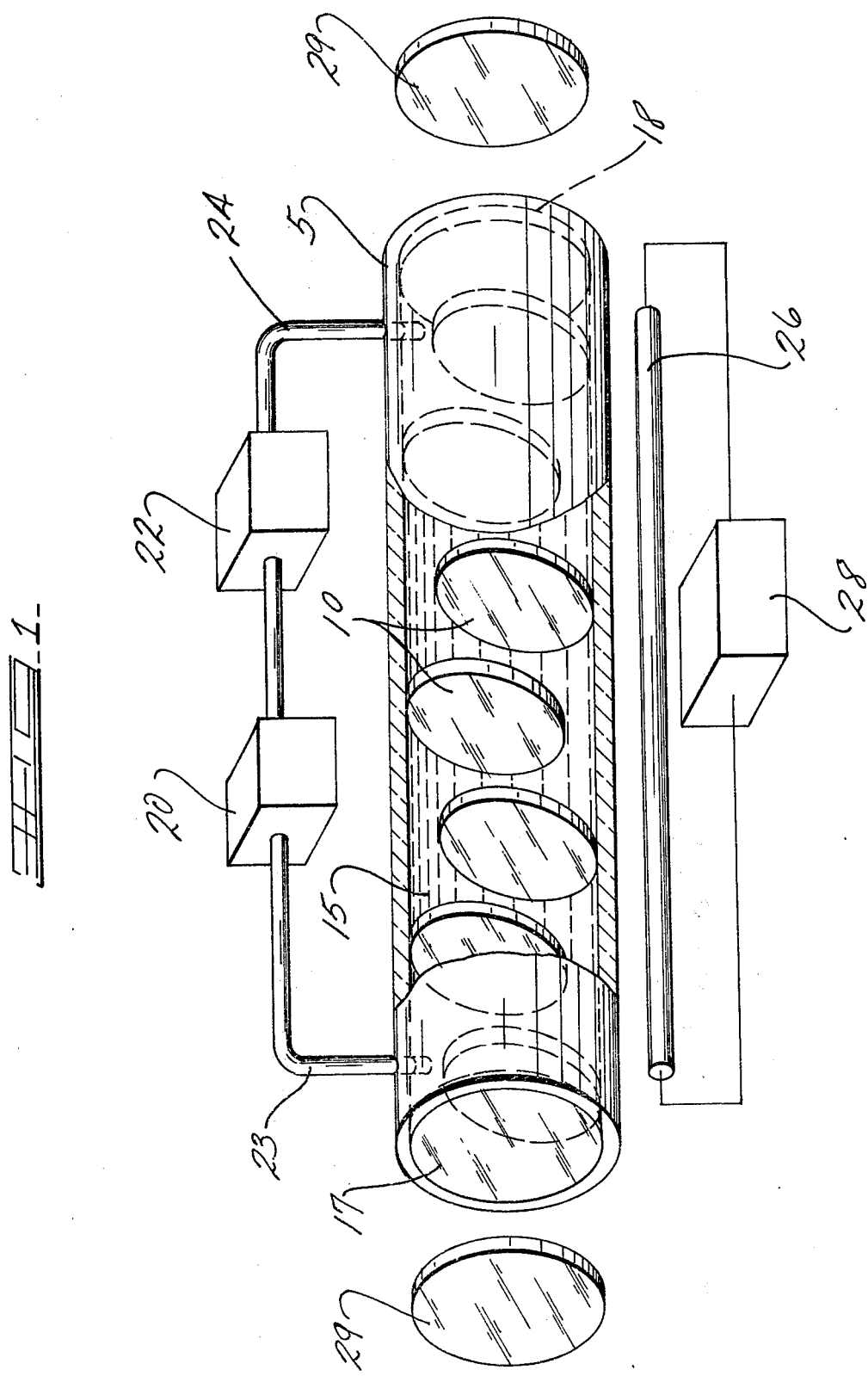

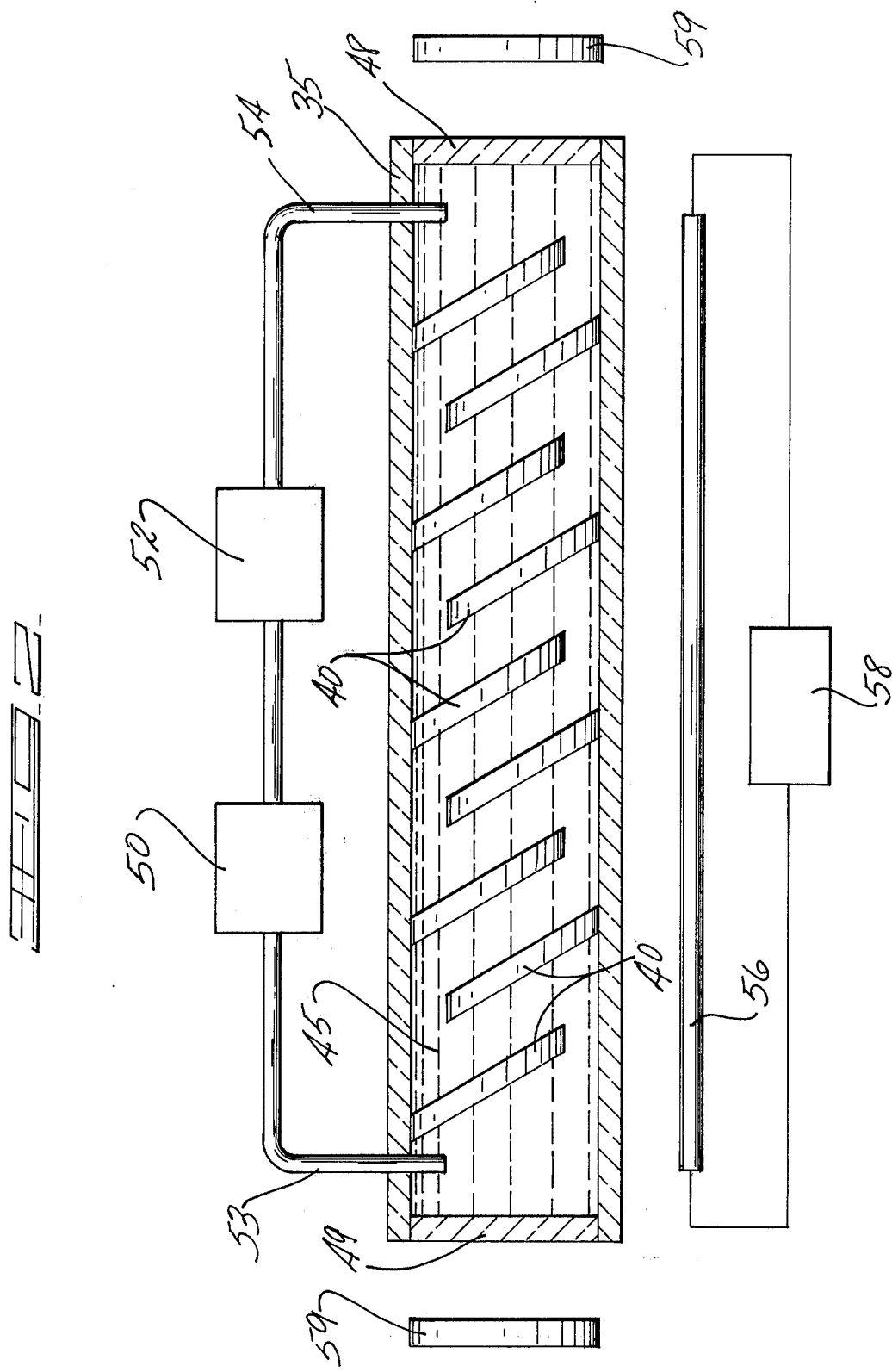

HYBRID LASER STRUCTURES

INVENTION

The present invention relates to hybrid laser structures that include a combination of a plurality of solid-state lasable plate elements spaced in a path along the optical axis of the structure, and a cooling liquid that fills the spaces between the plate elements and also lases at a different wave length than the solid-state material of the plate elements.

In the past, axial gradient lasers have been made from solid-state laser materials and particularly glass laser materials, such as disclosed in the Booth U.S. Pat. No. 3,569,860 and the Gudmundsen U.S. Pat. No. 3,487,330. These axial gradient lasers used employ lasable glass or crystalline discs or plates in a path along the optical axis of the laser structure. One drawback of the axial gradient laser has been the loss introduced by the cooling liquid, which results in low efficiencies.

An improvement over the above axial gradient lasers is shown in Owens-Illinois, Inc. U.S. Pat. No. 3,842,368, in which a cooling liquid is used that lases at the same wave length of the solid plate elements.

The present invention provides a more efficient hybrid laser structure that comprises:

A. a plurality of lasable, solid-state plate elements, each spaced from its neighbor and in a path along the optical axis of said laser structure, and including means for maintaining the plate elements in the spaced relationship to each other; and B. a lasable cooling liquid filling spaces between the plate elements with the optical path, the cooling liquid being capable of stimulated emission in conjunction with the solid-state plate elements, the liquid having lasing ions that are different than the lasing ions in the plate elements to provide lasing output at two or more different wave lengths.

The advantages of the present invention will be apparent from the specification that follows, the appended claims and the drawings, in which:

FIG. 1 is a schematic, partly perspective view of the hybrid laser structure of the present invention, employing a plurality of crystalline or glass laser discs and a cooling fluid that has a laser output at a different wave length than that of the laser discs; and FIG. 2 is a schematic elevational view of another embodiment of a hybrid laser structure according to the present invention employing solid-state laser plate elements, and lasable cooling fluid surrounding the same that provides a more efficient laser with the laser output of the solid-state plate elements being at one wave length and the laser output of the fluid at a different wave length.

The present invention provides an improved axial gradient laser structure that is a hybrid laser comprising, in combination:

A. a plurality of lasable plate elements that are preferably crystalline or glass laser discs, squares or rectangles, each element spaced from its neighbor and located in the path along the optical axis of the structure, and including means for maintaining the plate elements in their spaced relationship; and B. a lasable cooling fluid, such as selenium oxychloride doped with lasing ions that are different than those of the plate elements to provide laser output at different wave lengths to more efficiently utilize the pumping source.

As seen in FIG. 1, a hybrid laser structure is shown comprising a housing 5 for a plurality of plate elements 10 which are in the form of glass laser or crystalline (such as ruby) discs and a cooling fluid 15, such as selenium oxychloride doped with $Nd^{3+}$. The lasing ions of the fluid 15 are different than those of the elements 10 for a more efficient laser and better utilization of the pumping source. The housing 5 is provided with end members 17 and 18 and a means for admitting and removing liquid coolant from the housing, including a pump 20, a heat-exchanger 22, an inlet pipe 23 and an outlet pipe 24, which provides a pump-refrigerant system to force liquid coolant through the laser housing to thereby cool the plate elements 10 and also amplify the output of the elements.

As also seen in FIG. 1, there is provided a flash lamp 26 for pumping the laser disc, the particular flash lamp shown being elongated and supplied with operating energy from a power source 28. Also provided is a pair of end mirrors 29, as is well-known in the art.

As previously indicated, the improvement in the axial gradient laser structure is in a more efficient laser, the coolant being capable of stimulated emission and at an output at a different wave length than the output of the elements. For example, one liquid laser material that is suitable is selenium oxychloride doped with $Nd^{3+}$, which has a lasing spectra of about 1.065 microns, which will be different than that of the crystalline ruby plate element.

In another embodiment, which is shown in FIG. 2, there is provided a housing 35 and a plurality of solid-state plate elements in the form of glass or crystalline squares or plates 40 supported within the housing, as is well-known in the art of axial gradient laser construction. Also disposed within the housing is a cooling fluid 45 that surrounds each glass square that is a solid-state plate element, and provides a cooling fluid having lasing ions that lase at a different wave length than the lasing ions of the plates 40. In a manner similar to that described in FIG. 1, there are provided end members 48 and 49 for the housing. There is also provided a pump-refrigerant system for moving the cooling fluid in and out of the housing, the means for supplying and removing the fluid to the housing including a pump 50, a heat exchanger 52, an inlet pipe 53 and an outlet pipe 54 that connects the housing with the heat exchanger 52.

An elongated flashtube 56 is provided for pumping the glass plate elements 40 and also the lasable fluid 45. As is well-known, a source of power 58 is provided to supply the electrical energy to the flashtube or flash lamp 56.

As described in FIG. 1, a pair of end mirrors 59 is provided, as is well-known in axial gradient laser construction.

The axial gradient laser structure is well-known, and the lasable cooling fluid can be used in a variety of axial gradient laser structures. In general, when the plate elements are crystalline and doped with $Cr^{3+}$, a lasable cooling fluid, such as selenium oxychloride doped with $Nd^{3+}$, can be used in place of the conventional coolants, such as heavy water or dimethylsulfoxide. Incorporated by reference herein are patents showing suitable axial gradient laser structures for use with the lasable cooling fluid of the present invention, the patents being the Gudmundsen U.S. Pat. No. 3,487,330; Booth U.S. Pat. No. 3,569,860; and Zitkus U.S. Pat. No. 3,711,785.

A suitable fluid, as previously indicated, is selenium oxychloride doped with $Nd^{3+}$. An article entitled "Brillouin and Rayleigh Scattering in Aprotic Laser Solutions Containing Neodymium", Pappalardo, R; Lempicki, A. (Bayside Res. Cent., GTE Lab. Inc., Bayside, N.Y.)., J. Appl. Phys., 1972, 43(4), 1699–708 (Eng.), describes suitable $POCl_3$ lasing solutions, as well as $SeOCl_2$-based solutions, and this article is also incorporated by reference.

The solid-state plate elements suitable for use in the present invention are glass and crystalline materials, such as glass, ruby, garnet and plastics. The lasing ions are preferably $chromium^{3+}$ and $neodymium^{3+}$, but they can be other rare earth ions, such as trivalent erbium. As previously indicated, the cooling fluid should have lasing ions that provide stimulated emission at a different wave length than the stimulated emission from the solid-state plate element.

Other rare earth ions that can be used for the solid-state plate element and for the cooling fluid include $Praseodymium^{+++}$, $Samarium^{++}$, $Samarium^{+++}$, $Europium^{++}$, $Europium^{+++}$, $Terbium^{+++}$, $Erbium^{+++}$ and $Ytterbium^{+++}$.

Great advantages are obtained according to the present invention by choosing the solid and fluid lasing species so that both lasing species can be pumped and lased. That is, there must be two spectral regions in which the lasing output of one species is not strongly absorbed by the host materials or the other lasing species. A great variety of combinations of fluid and solid lasing species can be used. In the case of white light optical pumping, there will often be spectral regions which are not absorbed by one lasing species, but are absorbed by the other lasing species. Thus the combination of these lasing species exhibit an improved efficiency by utilizing a greater percentage of the white pumping light. As previously point out, this increase in efficiency is one of the advantages of this invention.

Applications for lasers which lase at two or more wave lengths include two wave length holography; two-step isotope separation or photochemical processing; increasing the tunable range of lasers; minimizing the interference effects of monochromatic laser radiation; and pollution monitoring with laser beams.

One preferred embodiment of the present invention is $Cr^{3+}$ (ruby) solid lasing elements and $Nd^{3+}$ fluid lasing elements, both of which are commonly pumped by flash lamps emitting white light. The solid ruby ($Cr^{3+}$) laser elements absorb light from 0.35 to 0.65 and lase at 0.694 um. The $Nd^{3+}$ fluid lasing element absorbs light in several bands from 0.36 to 0.90 um and lases at 1.06. The $Nd^{3+}$ has very low absorption at 0.694 um, and the $Cr^{3+}$ has very low absorption at 1.06 um. Thus both the solid and fluid lasing elements can be pumped by the same white light and lased.

An $Nd^{3+}$ solid lasing element is also suitable and can be used with an organic dye, vapor or liquid, fluid lasing element. A suitable organic dye is Rhodamine 640 (perchlorate) which lases at 0.65 um and absorbs from the UV to approximately 0.62 um. The $Nd^{3+}$ ions lase at 1.06 um, where the dye does not absorb. $Nd^{3+}$ ions absorb in several bands from the UV to 0.90 um, but do not absorb at 0.69 um. The organic dye can be used in the vapor form, and electric discharge pumping can be employed in addition to the optical pumping.

Good results have been obtained when the lasable plate element is a plurality of glass laser articles, such as discs made of a lithia-calcia-alumino silicate laser composition as set forth in U.S. Pat. No. 3,471,406 to Lee and Rapp. One specific glass laser composition that is a preferred solid-state laser material, as set forth in the Lee and Rapp patent, has the following ingredients in approximate mole percentages:

| Ingredient | Mole Percent |
|---|---|
| $SiO_2$ | 60 |
| $Al_2O_3$ | 2.5 |
| $Li_2O$ | 27.5 |
| $CaO$ | 10 |
| $Nd_2O_3$ | 0.5 |

What is claimed is:

1. A hybrid laser structure for providing a dual wavelength output and increased efficiency in the use of white pump light, in combination,
   (A) a plurality of lasable plate elements having a first absorption region of white pump light and an output beam at a first wavelength, each spaced from its neighbor and in a path along the optical axis of said laser structure, and including means for maintaining said plate elements in said spaced relation; and
   (B) a lasable cooling liquid filling the spaces between said plate elements, the liquid having lasing ions having a second absorption region of white pump light and an output beam at a second wavelength, said plate elements and said cooling liquid being chosen so that said first and second output beam wavelengths are not strongly absorbed by either the lasable plate elements or the lasable cooling liquid.

2. The invention defined in claim 1 wherein each said plate element is ruby.

3. In a laser structure having a plurality of laser plate elements having a first absorption region of white pump light and an output beam at a first wavelength supported in spaced relation along the optical axis of said laser structure, and having a liquid coolant in the spaces between said plate elements, the improvement comprising said liquid coolant being a lasable coolant having a second absorption region of white pump light and an output beam at a second wavelength to provide lasing output at two different wave lengths and increased effeciency in the use of white pump light.

4. The invention of claim 3 wherein each said plate element is ruby and said liquid comprises selenium oxychloride doped with $Nd^{3+}$.

* * * * *